United States Patent
Li et al.

(10) Patent No.: US 9,645,754 B2
(45) Date of Patent: May 9, 2017

(54) DATA DUPLICATION THAT MITIGATES STORAGE REQUIREMENTS

(71) Applicant: International Business Machines Corporation, Armonk, NY (US)

(72) Inventors: Yan Xin Li, Beijing (CN); Yu Meng Li, Beijing (CN); Michael G. Sisco, Vail, AZ (US); Xin Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 14/589,928

(22) Filed: Jan. 5, 2015

(65) Prior Publication Data
US 2015/0193160 A1 Jul. 9, 2015

(30) Foreign Application Priority Data
Jan. 6, 2014 (CN) .......................... 2014 1 0005001

(51) Int. Cl.
*G06F 3/06* (2006.01)
*G06F 11/00* (2006.01)
(Continued)

(52) U.S. Cl.
CPC ............ *G06F 3/0619* (2013.01); *G06F 3/065* (2013.01); *G06F 3/067* (2013.01); *G06F 3/0641* (2013.01);
(Continued)

(58) Field of Classification Search
CPC ...... G06F 3/0619; G06F 3/0641; G06F 3/065; G06F 3/067; G06F 11/1004;
(Continued)

(56) References Cited

U.S. PATENT DOCUMENTS

| 7,870,105 B2 | 1/2011 | Arakawa et al. |
| 8,112,679 B2 * | 2/2012 | Bean .................... G06F 11/008 711/114 |

(Continued)

OTHER PUBLICATIONS

Advanced Storage Products Group, "Identifying the Hidden Risk of Data Deduplication: How the HYDRAstor Solution Proactively Solves the Problem," Technical Report WP103-3 0709, NEC Corporation of America, copyright 2009, 9 pages.

(Continued)

*Primary Examiner* — Gary Portka
(74) *Attorney, Agent, or Firm* — Yee & Associates, P.C.; Richard A. Wilhelm (57) ABSTRACT

In a data protection field, a method for storing data in a data deduplication system, comprising: obtaining data chunks achieved from data deduplication; assigning the data chunks to at least one group; recording grouping information of the data chunks; with respect to each group, calculating parity data chunks based on data chunks in the group, where the parity data chunks are used for, in response to a data chunk in the group being damaged, causing the damaged data chunk to be recovered on the basis of other data chunks in the group and parity data chunks of the group; and storing the calculated parity data chunks. Also provided is an apparatus for storing data and a data deduplication system. The technical solution provided herein facilitates occupying as little physical storage space as possible while reducing the risk of the spread of data loss caused by the data deduplication technology.

20 Claims, 4 Drawing Sheets

(51) Int. Cl.
*G06F 17/30* (2006.01)
*G06F 11/14* (2006.01)

(52) U.S. Cl.
CPC ........ *G06F 11/00* (2013.01); *G06F 17/30159* (2013.01); *G06F 11/1453* (2013.01)

(58) Field of Classification Search
CPC ............. G06F 11/1076; G06F 11/1453; G06F 12/0253; G06F 12/0261; G06F 2212/1032
USPC ................................................ 714/6.13, 6.24
See application file for complete search history.

(56) References Cited

U.S. PATENT DOCUMENTS

| | | |
|---|---|---|
| 8,290,915 B2 | 10/2012 | Anglin |
| 8,442,952 B1 | 5/2013 | Armangau et al. |
| 2009/0132619 A1* | 5/2009 | Arakawa ............... G06F 3/0605 |
| 2010/0036887 A1 | 2/2010 | Anglin et al. |
| 2012/0109907 A1 | 5/2012 | Mandagere et al. |
| 2014/0115579 A1* | 4/2014 | Kong .................... G06F 3/0605 718/1 |
| 2015/0058583 A1* | 2/2015 | Baldwin ............... G06F 3/0641 711/162 |

OTHER PUBLICATIONS

Li et al., "Reliability Analysis of Deduplicated and Erasure-Coded Storage," ACM SIGMETRICS Performance Evaluation Review, vol. 38, No. 3, Dec. 2010, pp. 4-9.

Liu et al., "R-ADMAD: High Reliability Provision for Large-Scale De-duplication Archival Storage Systems," Proceedings of the 23rd International Conference on Supercomputing (ISC'09), Jun. 2009, pp. 370-379.

* cited by examiner

DATA DUPLICATION THAT MITIGATES STORAGE REQUIREMENTS

CROSS-REFERENCE TO RELATED APPLICATION(S)

This application claims the benefit of priority to Chinese Patent Application No. 20140005001.5, filed Jan. 6, 2014, the contents of which are incorporated herein by reference.

TECHNICAL FIELD

The present invention relates to the data protection field, and more specifically, to a method, apparatus and system for storing data.

BACKGROUND

Data backup is critical to storage systems. In backup systems, however, data deduplication technology is a newly introduced technical solution for reducing storage space. The data deduplication technology mainly consists of the following aspects: splitting a data object into non-overlapping data chunks; generating for each data chunk an identification (ID) based on its content; if a certain data chunk has a unique identification, i.e. the data chunk with the unique identification has not been stored yet, then storing the data chunk on a physical storage device; if an identification of a certain data chunk is the same as an identification of a data chunk previously stored on a physical storage device, then discarding the certain data chunk and only storing a pointer pointing to the data chunk with the same identification.

As seen above, the data deduplication technology can significantly reduce the required storage space for backup. However, data deduplication gives rise to the risk that data loss spreads rapidly. For example, when one data object suffers damage, other data objects referencing data chunks in the one data object will suffer damage too. Such chain damage prevents the data deduplication technology from being effectively implemented, and accordingly advantageous effects of the technology cannot be achieved.

To reduce the risk that data loss spreads and bring data deduplication technology into play, there is proposed in the prior art a compromised technical solution, i.e. generating an integral number of copies of data segments based on the reference count. That is, at least one copy should be stored for a data segment; if some data segment is referenced for multiple times, then a plurality of copies will be stored so as to protect this important data segment. By means of this technical solution, after a stored data segment is damaged, since copies of the data segment have been saved, all data objects referencing the data segment will not be damaged, and further the risk that data loss spreads is reduced. However, considering one or more copies should be stored for each data segment, this technical solution will consume lots of storage space, thereby lowering down the utilization rate of storage space. As a result, the effect that data deduplication reduces the storage space requirement cannot come into a full play.

SUMMARY

In view of the above problems in the prior art, the embodiments of the present invention provide a method, apparatus and system for storing data, so as to reduce the risk of the spread of data loss and occupy as little physical storage space as possible.

According to one aspect of the present invention, there is provided a method for storing data, the method being used for a data deduplication system, the method comprising: obtaining data chunks achieved from data deduplication; assigning the data chunks to at least one group; recording grouping information of the data chunks; with respect to each group, calculating parity data chunks based on data chunks in the group; storing the calculated parity data chunks; if one data chunk is damaged, recovering the damaged data chunk on the basis of other data chunks in a group to which the damaged data chunk belongs and parity data chunks of the group.

According to another aspect of the present invention, there is provided an apparatus for storing data, the apparatus being used for a data deduplication system, the apparatus comprising: a data chunk obtaining module configured to obtain data chunks achieved from data deduplication; a grouping module configured to assign the data chunks to at least one group; a recording module configured to record grouping information of the data chunks; a calculating module configured to, with respect to each group, calculate parity data chunks based on data chunks in the group; a storing module configured to store the calculated parity data chunks; and a first recovering module configured to, if one data chunk is damaged, recover the damaged data chunk on the basis of other data chunks in a group to which the damaged data chunk belongs and parity data chunks of the group.

According to another aspect of the present invention, there is provided a data deduplication system, comprising an apparatus for storing data as described above.

The technical solution provided by the present invention makes it possible to occupy as little physical storage space as possible while reducing the risk of the spread of data loss.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Figure 1:
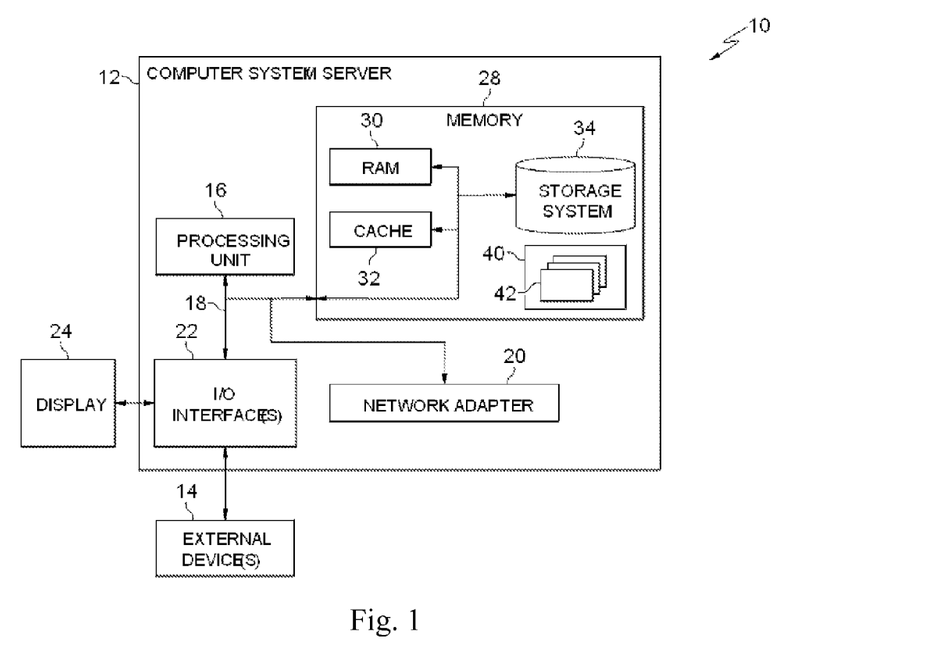
FIG. 1 shows a block diagram of an exemplary computer system/server 12 which is applicable to implement the embodiments of the present invention.

Referring now to FIG. 1, in which a block diagram of an exemplary computer system/server 12 which is applicable to implement the embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including the system memory 28 and the processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
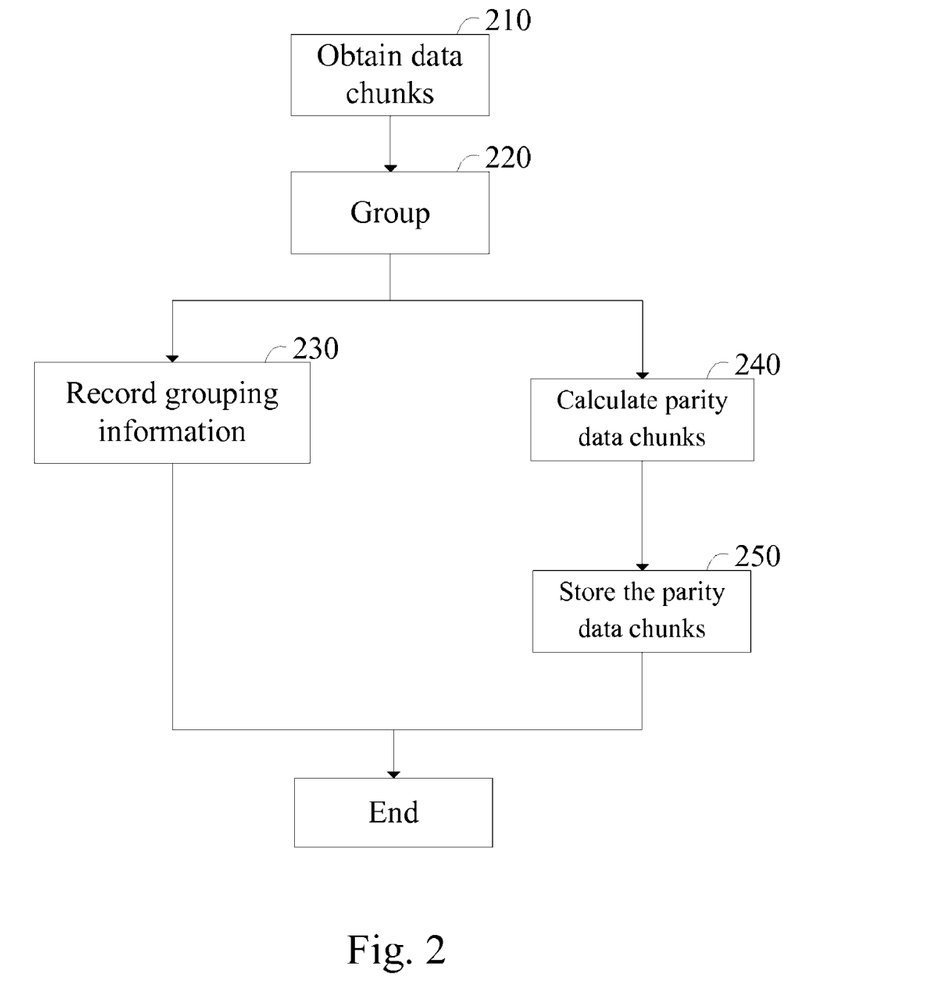
FIG. 2 shows a schematic flowchart of a method for storing data according to one embodiment of the present invention.

With reference now to FIG. 2, one embodiment of the present invention provides a method for storing data. The method is used in a data deduplication system. The method comprises: in step 210, obtaining data chunks achieved from data deduplication; in step 220, assigning the data chunks to at least one group; in step 230, recording grouping information of the data chunks; in step 240, with respect to each group, calculating parity data chunks based on data chunks in the group, wherein the parity data chunks are used for, in response to a data chunk in the group being damaged, causing the damaged data chunk to be recovered on the basis of other data chunks in the group and parity data chunks of the group; in step 250, storing the calculated parity data chunks. According to the method provided by this embodiment, where a data chunk is damaged, the data chunk can be recovered using parity data chunks and other data chunks in the same group, thereby reducing the risk that data loss spreads. In the meanwhile, with the method provided by this embodiment, only parity data chunks and data chunks achieved from data deduplication need to be stored. That is, the method according to this embodiment merely additionally stores parity data chunks for each group compared with data chunks achieved from data deduplication. Compared with the prior art, the method provided by this embodiment no longer has to store any copy for data chunks achieved from data deduplication, thereby significantly reducing the required storage space. In this embodiment, it is not intended to restrict a method for grouping data chunks, or restrict the amount of data chunks in each group, or restrict how many groups each data chunk is assigned to. For example, the amount of data chunks in all groups may be equal, or different of course. During concrete implementation, the amount of data chunks in each group may be set according to particular environment; when the environment changes, the amount of data chunks in each group may be changed. For example, one data chunk may be assigned to only one group. Or one data chunk may be assigned to multiple groups, which can reduce to a greater extent the risk that data loss spreads. In this embodiment, it is also not intended to restrict a method for calculating parity data chunks as used by each group; for example, parity check may be used. Those skilled in the art may understand other check methods such as Fletcher's checksum, Adler-32 can be used. In this embodiment, there is no specific execution order between step 230 and step 240; that is, step 230 and step 240 may be executed concurrently, or step 230 or step 240 may be executed first.

In one embodiment of the present invention, for example the embodiment shown in FIG. 2, step 230 comprises recording grouping information of the data chunks in a form of table. In another embodiment of the present invention, step 230 comprises, for example, recording grouping information of the data chunks in a form of metadata file. For example, grouping information of the data chunks may be recorded in the form as Table 1.

TABLE 1

Data Chunk Grouping Information Recording Table

| Chunk ID | Group Number |
|---|---|
| 1 | 01, 02, 03 |
| 2 | 01 |
| 3 | 01 |
| 4 | 02, 03 |
| 5 | 02 |
| 6 | 02, 04 |
| 7 | 03 |
| 8 | 04 |

As seen from Table 1, group 1 consists of data chunks 1, 2 and 3; group 2 consists of data chunks 1, 4, 5 and 6; group 3 consists of data chunks 1, 4 and 7; and group 4 consists of data chunks 6 and 8. The amounts of data chunks in these 4 groups are different. Data chunks 1, 4 and 6 each are assigned to multiple groups.

In one embodiment of the present invention, if this embodiment is implemented as a plug-in of a data deduplication system, then step 210 may be implemented as obtaining data chunks from a storage area directly. If this embodiment is implemented as a new data deduplication system, then step 210 comprises, for example, directly achieving data chunks by data deduplication technology.

In one embodiment of the present invention, step 220 comprises, for example: assigning the data chunks to at least one group according to a predefined rule. In this embodiment, the predefined rule comprises at least one of: grouping by importance of the data chunks, with data chunks of higher importance being assigned to more groups; grouping by physical storage locations of the data chunks, with data chunks at adjacent physical locations being assigned to different groups; grouping by attributes of the data chunks, with data chunks with the same attributes being assigned to different groups; grouping by attributes of the data chunks, with data chunk with specific attributes being assigned to more groups; grouping by an order between the data chunks; and using a random grouping method. Importance of a data chunk may be evaluated from various respects. For example, the importance may be determined from a reference count of the data chunk: the more the reference count, the higher the importance. For another example, the importance may be determined from an attribute of the data chunk itself. For instance, if user A is an important client, then a data chunk of user A is more important; or if data of financial transaction type are important data, then a data chunk corresponding to such data is more important. Those skilled in the art may understand the importance of a data chunk may be judged from other factor, combinations of the above factors, or combinations of other factor and the above factors, which is not detailed here. By assigning data chunks of higher importance to more groups, it can be better ensured that important data chunks may be recovered for more chances, thereby reducing the risk that the damage of important data chunks spreads data loss. Illustration is presented by taking Table 1 as an example. As seen from Table 1, data chunk 1 is assigned to 3 groups; if data chunk 1 is damaged and also data chunk 2 is damaged, then data chunk 1 cannot be recovered by parity data chunks for group 1, but still it may be attempted to recover data chunk 1 by group 2 and group 3. In this manner, the protection for important data chunks is increased to a greater extent. By assigning data chunks with the same attribute to different groups, the problem that data chunks with the same attribute cannot be recovered once being damaged can be avoided. Assigning data chunks with specific attributes to more groups makes it possible to flexibly configure space to a certain extent, for example, assigning data chunks of users with higher SLA to more groups. By assigning data chunks at adjacent physical storage locations to different groups, it is possible to prevent, in the greatest extent, data chunks damaged by physical damage from being concentrated in one or several groups and thus being hard to recover. Further, by assigning data chunks at adjacent physical storage locations to different groups, the damage spread caused by physical storage damage can be reduced. Those skilled in the art may understand the grouping may be implemented using more grouping rules, so long as all data chunks to be grouped can be assigned to at least one group, which is not detailed here.

In one embodiment of the present invention, step 240 for example comprises: with respect to each group, using parity check to calculate the parity data chunks on the basis of data chunks in the group. Illustration is presented still in the context of the example in Table 1. Group 4 consists of data chunks 6 and 8. An exclusive OR operation is performed on bits at the same location of data chunks 6 and 8, and the result being achieved is the parity data chunk of group 4. Those skilled in the art may understand other check algorithms may also be used to calculate parity data chunks, such as Fletcher's checksum or Adler-32, so long as a generated parity data chunk can recover a data chunk of the group in the case the data chunk is damaged. As has been mentioned in the above embodiment, either a same or different check algorithms may be used for different groups. For example, parity check may be used to generate parity data chunks with respect to groups 1 to 4 in the example in Table 1; or parity check is used with respect to groups 1 and 2; Fletcher's checksum is used with respect to group 3; and Adler-32 is used with respect to group 4. Moreover, the same or different amounts of parity data chunks may be generated with respect to different groups; even if the same check algorithm is used to generate parity data chunks, the generated amounts of parity data chunks may differ, which is not detailed here. In particular, with respect to each group, a check algorithm used by this group may be determined from at least one of attributes and importance of data chunks contained in the group, and parity data chunks are calculated using the determined check algorithm on the basis of data chunks in the group. Further, the amount of parity data chunks being generated may be determined from at least one of attributes and importance of data chunks contained in the group. For example, if a certain group consists of several important data chunks, then several parity data chunks may be generated for this group, so as to ensure that damaged data chunks can be recovered where a plurality of data chunks in the group are damaged.

In one embodiment of the present invention, step 250 for example comprises: storing the calculated parity data chunks in other physical storage area than where the data chunk is stored. In this embodiment, different physical storage area may be a different physical storage device. Further, different physical storage device may be located at a geographical location that is far away. In this manner, the risk caused by physical storage damage can be reduced to a greater extent, and it is avoided that parity data chunks and data chunks achieved from data deduplication are damaged concurrently.

In one embodiment of the present invention, data chunk damage for example comprises physical storage damage or logical damage, wherein the logical damage is, for example, as below: a data chunk is stored on a shared magnetic disk A, and multiple applications have write permissions to the shared magnetic disk A, so the data chunk on shared magnetic disk A is at risk of being overwritten. Where a certain data chunk is damaged, the damaged data chunk can be recovered according to other data chunks and parity data chunks in the group to which the damaged data chunk belongs. In implementation, the damaged data chunk can be recovered according to the amount of generated parity data chunks and the adopted check algorithm. When recovering the damaged data chunk, all of the other data chunks in the groups might be used, or part of the other data chunks in the group might be used. Illustration is presented still in the context of the example shown in Table 1. Group 3 consists of data chunks 1, 4 and 6. In generating parity data chunks, parity check is used to perform an exclusive OR operation on data chunks 1, 4 and 6 by bits, which results in a data chunk x. Later data chunk 1 is damaged. At this point, data chunk 1 can be recovered through an exclusive OR operation on parity data chunk x, data chunk 4 and data chunk 6.

In one embodiment of the present invention, the method as shown in FIG. 2 may further comprise: in response to at least one of a data chunk expiring or being deleted, cancelling a group to which the data chunk belongs, and updating grouping information of other data chunks in the group to which the data chunk belongs. When a certain data chunk expires or is deleted, a group to which the data chunk belongs needs to be cancelled, and grouping information of other data chunks in the cancelled group is updated accordingly. Illustration is presented still in the context of the example shown in Table 1. If data chunk 6 expires, then groups 2 and 4 are cancelled, and grouping information of data chunks 1, 4 and 5 contained in group 2 and of data chunk 8 contained in group 4 are updated accordingly. In this example, 02 and 04 may be deleted from group number corresponding to these data chunks. Furthermore, information of data chunk 6 may be completely deleted from the table so as to save more space. In another embodiment of the present invention, further, parity data chunks of the cancelled group may also be deleted, so as to release more physical storage space.

In one embodiment of the present invention, the method as shown in FIG. 2 further comprises: with respect to other data chunks in the cancelled group, assigning data chunks that need to be regrouped to new groups according to a predefined rule; recording grouping information of the data chunks that are assigned to the new group; calculating parity data chunks on the basis of data chunks in the new groups; and storing the parity data chunks of the new group. In this embodiment, the predefined rule for regrouping may be either the same as, or different from, the predefined rule for initially grouping. The grouping method, the method for calculating parity data chunks and the solution for storing parity data chunks in this embodiment may refer to the description of the above embodiment, which is not detailed here. Moreover, the grouping method, the method for calculating parity data chunks and the solution for storing parity data chunks being used in regrouping may be different from or the same as those in initially grouping, which is not limited in the embodiments of the present invention. In this embodiment, the regrouping may be implemented by recording grouping status of data chunks. Detailed description is presented below on the basis of the example shown in Table 1 in conjunction with Table 2.

TABLE 2

Data Chunk Grouping Information and Grouping Status Recording Table

| Chunk ID | Group Number | Grouping Status |
|---|---|---|
| 1 | 01, 03 | N |
| 2 | 01 | Y |
| 3 | 01 | Y |
| 4 | 03 | N |
| 5 |  | N |
| 7 | 03 | Y |
| 8 |  | N |

It can be seen that on the basis of Table 1, one more columns is added for recording grouping status of data chunks in Table 2. In the example shown in Table 2, since data chunk 6 is invalid, corresponding information of data chunk 6 is deleted, and groups 2 and 4 to which data chunk 6 belongs are cancelled. Accordingly, grouping information and grouping status of data chunks 1, 4, 5 and 8 are updated, i.e. groups 2 and 4 are deleted from Group Number corresponding to these data chunks, and grouping status of these data chunks are set as non-grouped, represented as N here. In regrouping, the predefined rule may comprise grouping only those data chunks whose grouping status is N. Or the predefined rule may comprise: judging whether data chunks whose grouping status is N need to be regrouped or not according to an existing rule; if yes, regrouping according to the existing rule; if not, re-setting grouping status of these data chunks as Y, wherein the existing rule may be the predefined rule in initial grouping as mentioned in the above embodiment.

In one embodiment of the present invention, the method as shown in FIG. 2 may further comprise: in response to at least one of a data chunk expiring or being deleted, if the rest of the data chunks in a group to which the data chunk belongs are more than 1, then recalculating parity data chunks of the group on the basis of the rest of the data chunks, and replacing original parity data chunks by the recalculated parity data chunks; if the rest of the data chunks in a group to which the data chunk belongs are less than or equal to 1, then cancelling the group and regrouping, etc. by employing the above described embodiments.

In one embodiment of the present invention, the method as shown in FIG. 2 may further comprise: if a data chunk is damaged, then recovering the damaged data chunk on the basis of other data chunks in a group to which the damaged data chunk belongs and parity data chunks of said group.

In one embodiment of the present invention, the method as shown in FIG. 2 may further comprise: if several data chunks in a same group are damaged and can be recovered on the basis of other undamaged data chunks in the same group and parity data chunks of the same group, then recovering the damaged data chunks on the basis of other undamaged data chunks in the same group and parity data chunks of the same group.

In one embodiment of the present invention, the method as shown in FIG. 2 may further comprise: if several data chunks in a same group are damaged and cannot be recovered on the basis of other undamaged data chunks in the same group and parity data chunks of the same group, then seeking a further group to which a first data chunk among the damaged data chunks belongs; recovering the first data chunk on the basis of other data chunks in the found group and parity data chunks of the found group; and recovering other damaged data chunks in the same group on the basis of the recovered first data chunk, the other data chunks in the same group and parity data chunks of the same group. In this embodiment, when several data chunks are damaged, perhaps these damaged data chunks cannot be recovered only by other data chunks in the same group and parity data chunks of the same group, at which point efforts are made to seek among these damaged data chunks in the group whether there is a data chunk that can be recovered through other groups. If such a data chunk may be found, then it is recovered through other groups, and then other damaged data chunks are recovered through this recovered data chunk. Illustration is given still in the context of the example shown in Table 1. Group 2 consists of data chunks 1, 4, 5 and 6. For example, both data chunks 1 and 5 are damaged because the physical storage device damages or a user mistakenly deletes data chunks; at this point, data chunks 1 and 5 cannot be recovered on the basis of data chunks 4 and 6 and parity data chunks of group 2. It is found by looking up in Table 1 that data chunk 1 is also assigned to groups 1 and 3 and there is no other damaged data chunk in group 1. Thus, data chunk 1 can be recovered according to other data chunks in group 1 and parity data chunks of group 1. Next, data chunk 5 is recovered on the basis of the recovered data chunk 1 and other data chunks in group 2 and parity data chunks of group 2. According to this example, those skilled in the art can obtain concrete implementation schemes for recovery when more data chunks are damaged or data chunks in more groups are damaged, which is not detailed here.

Figure 3:
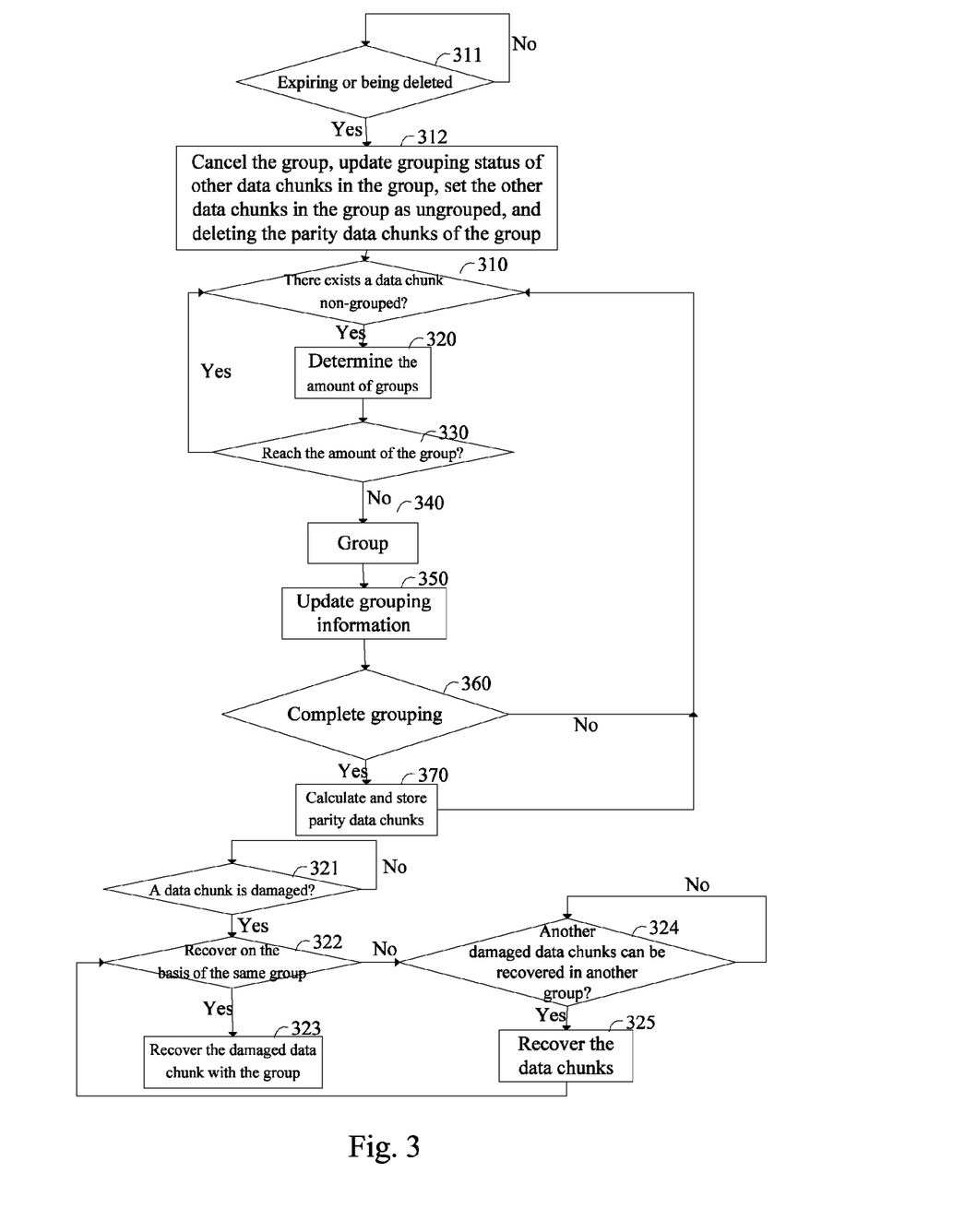
FIG. 3 shows a schematic flowchart according to another embodiment of the present invention.

The above method embodiments may combine together and cross-reference, thereby resulting in more embodiments. As a simple example, the above three embodiments of data chunk recovery can combine together, whereby more embodiments are obtained. A combined example is presented below by taking the method shown in FIG. 3 for example. With reference to FIG. 3, the embodiments of the present invention provide a method for storing data, the method comprising:

Step 310: judging whether there exists a data chunk whose grouping status is non-grouped or not, and if yes, the flow proceeding to step 320; if not, the flow ending;

Step 320: determining, according to importance of the non-grouped data chunk, the amount of groups to which the data chunk should be assigned;

Step 330: judging whether the amount of groups to which the data chunks has been assigned reaches the amount determined in step 320 or not, and if yes, the flow proceeding to step 310; if not, the flow proceeding to step 340;

Step 340: assigning the data chunk to one or more groups according to a predefined grouping rule;

Step 350: updating grouping information of the data chunk;

Step 360: judging whether grouping has been completed or not, e.g. the amount of data chunks in the group has reached a predefined amount, and if yes, the flow proceeding to step 370; if not, the flow proceeding to step 310. Those skilled in the art may understand there is no specific execution order between steps 350 and 360, i.e. steps 350 and 360 may be executed in parallel, or step 350 or step 360 is executed first;

Step 370: calculating parity data chunks of the group and storing them, then the flow proceeding to step 310;

Step 311: judging whether or not there is a data chunk expiring or being deleted, and if yes, the flow proceeding to step 312, if not, repeating step 311;

Step 312: cancelling a group to which the expiring or deleted data chunk belongs, setting other data chunks in the group as non-grouped status, and modifying grouping information of other data chunks in the group and deleting parity data chunks of the group, subsequently the flow proceeding to step 310;

Step 321: judging whether or not there is a data chunk being damaged, and if yes, the flow proceeding to step 322. Those skilled in the art may understand step 321 may be executed concurrently with any of steps 310 to 370, after one of steps 310 to 370 or after all steps 310 to 370 are completed;

Step 322: judging whether or not the damaged data chunk can be recovered on the basis of data chunks in the same group or parity data chunks of the group, and if yes, the flow proceeding to step 323, if not, the flow proceeding to step 324;

Step 323: recovering the damaged data chunk on the basis of data chunks in the same group and parity data chunks of the group;

Step 324: finding other damaged data chunks in the same group, judging whether or not the data chunks can be recovered in other groups to which the data chunk belongs, and if yes, the flow proceeding to step 325; if not, repeating step 324;

Step 325: recovering the data chunk on the basis of the found other data chunks in the same group and parity data chunks of the group, and returning to step 322.

Those skilled in the art may obtain more embodiments according to the embodiment shown in FIG. 3, which is not detailed here.

Figure 4:
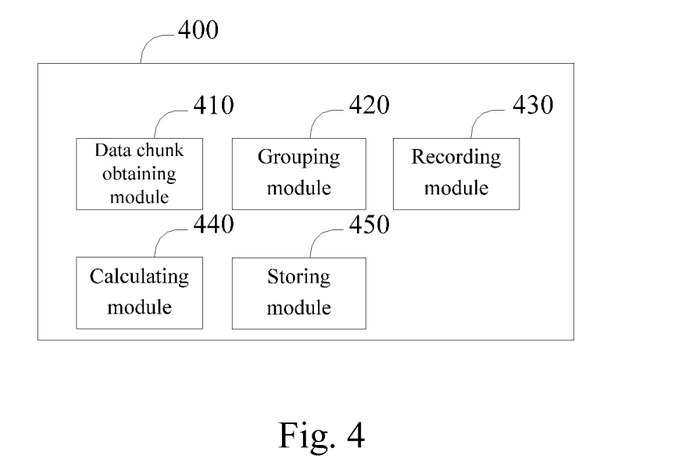
FIG. 4 shows a schematic structural diagram of an apparatus for storing data according to one embodiment of the present invention.

The various embodiments implementing the method of the present invention have been described above with respect to the accompanying drawings. Those skilled in the art may understand that the method may be implemented in software, hardware or combinations of software and hardware. Moreover, those skilled in the art may understand by implementing various steps in the above method in software, hardware or combinations of software and hardware, there may be provided an apparatus for storing data. Even though these devices and apparatuses have the same hardware structure as a general-purpose processing device, the functionality of software contained therein makes these devices and apparatuses manifest distinguishing properties from the general-purpose processing device, thereby forming devices and apparatuses of the various embodiments of the present invention. With reference to FIG. 4, detailed description is presented below to an apparatus for storing data according to one embodiment of the present invention.

With reference to FIG. 4, the embodiment of the present invention provides an apparatus 400 for storing data. Apparatus 400 is used for a data deduplication system, the apparatus 400 comprising: a data chunk obtaining module 410 configured to obtain data chunks achieved from data deduplication; a grouping module 420 configured to assign the data chunks to at least one group; a recording module 430 configured to record grouping information of the data chunks; a calculating module 440 configured to, with respect to each group, calculate parity data chunks based on data chunks in the group, wherein the parity data chunks are used for, in response to a data chunk in the group being damaged, causing the damaged data chunk to be recovered on the basis of other data chunks in the group and parity data chunks of the group; a storing module 450 configured to store the calculated parity data chunks. By means of apparatus 400 provided by this embodiment, where only storage space required by a few parity data chunks is added, the risk of the spread of data loss can be reduced, so that data deduplication technology is put into application and further promotion. Those skilled in the art may understand that data chunk obtaining module 410, for example, may be one part of the original data deduplication system and generates data chunks from data deduplication technology; or data chunk obtaining module 410 may be a new module for directly obtaining data chunks achieved from data deduplication technology.

In one embodiment of the present invention, grouping module 420 is specifically configured to assign the data chunks to at least one group according to a predefined rule, and the predefined rule comprises at least one of: grouping by importance of the data chunks, with data chunks of higher importance being assigned to more groups; grouping by physical storage locations of the data chunks, with data chunks at adjacent physical locations being assigned to different groups; grouping by attributes of the data chunks, with data chunks with the same attributes being assigned to different groups; grouping by attributes of the data chunks, with data chunks with specific attributes being assigned to more groups; grouping by an order between the data chunks; using a random grouping method.

In one embodiment of the present invention, calculating module 440 comprises, for example, one of the following submodules: a parity check submodule configured to, with respect to each group, using parity check to calculate the parity data chunks on the basis of data chunks in the group; a flexible check submodule configured to, with respect to each group, determine a check algorithm used by the group according to at least one of attributes and importance of data chunks included in the group, and use the determined check algorithm to calculate parity data chunks on the basis of data chunks in the group. Those skilled in the art may understand that calculating module 440 may further comprise a check submodule using other algorithm, such as an Adler-32 check submodule.

In one embodiment of the present invention, apparatus 400 may further comprise: a cancelling module configured to, in response to at least one of a data chunk expiring or being deleted, cancel a group to which the data chunk belongs, and update grouping information of other data chunks in the group to which the data chunk belongs.

In one embodiment of the present invention, apparatus 400 may further comprise: a regrouping module configured to, with respect to other data chunks in the cancelled group, assign data chunks that need to be regrouped to a new group according to a predefined rule; a re-recording module configured to record grouping information of data chunks that are assigned to the new group; a recalculating module configured to calculate parity data chunks on the basis of data chunks in the new group; and a restoring module configured to store the parity data chunks of the new group. Those skilled in the art may understand that in practice, the above regrouping module, re-recording module, recalculating module and restoring module may be implemented as a same hardware or logical structure as, or different structure than the grouping module, the recording module, the calculating module and the storing module, which is not limited here.

In one embodiment of the present invention, apparatus 400 further comprises: a deleting module configured to, in response to at least one of a data chunk expiring and being deleted, delete parity data chunks of a group to which the data chunk belongs.

In one embodiment of the present invention, apparatus 400 further comprises at least one of the following modules: a first recovering module configured to, if a data chunk is damaged, recover the damaged data chunk on the basis of other data chunks in a group to which the damaged data chunk belongs and parity data chunks of said group; a second recovering module configured to, if several data chunks in a same group are damaged and can be recovered on the basis of other undamaged data chunks in the same group and parity data chunks of the same group, recover the damaged data chunks on the basis of the other undamaged data chunks in the same group and the parity data chunks of the same group; a third recovering module configured to, if several data chunks in a same group are damaged and cannot be recovered on the basis of other undamaged data chunks in the same group and parity data chunks of the same group, seek a further group to which a first data chunk among the damaged data chunks belongs; recover the first data chunk on the basis of other data chunks in the found group and parity data chunks of the found group; and recover other damaged data chunks in the same group on the basis of the recovered first data chunk, the other data chunks in the same group and the parity data chunks of the same group. Those skilled in the art may understand the first, second and third recovering modules may adopt the same or different techniques in respect of recovery. Moreover, the first, second and third recovering modules may be implemented as the same hardware or logic.

In one embodiment of the present invention, storing module 450 and/or the restoring module may be specifically configured to store the calculated parity data chunks at other physical storage area than where the data chunks are stored.

The implementation details of the above apparatus embodiments may reference the corresponding method embodiments and are thus not detailed here. Moreover, the above apparatus embodiments may reference each other and combine together, thereby obtaining more embodiments.

Figure 5:
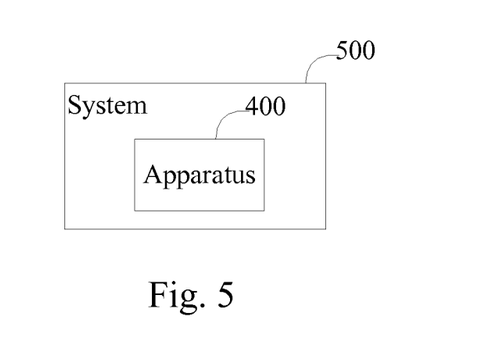
FIG. 5 shows a schematic structural diagram of a data deduplication system according to one embodiment of the present invention.

As shown in FIG. 5, the embodiments of the present invention provide a data deduplication system 500. This system 500 comprises apparatus 400 for storing data as shown in FIG. 4.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for storing data for a data deduplication system, the method comprising:
    obtaining data chunks achieved from data deduplication;
    assigning the data chunks to at least one group;
    recording grouping information of the data chunks, wherein the grouping information associates each data chunk of the data chunks to a given group of the at least one group;
    with respect to each group, calculating parity data chunks based on data chunks in the group, wherein the parity data chunks are used for, in response to a data chunk in the group being damaged, causing the damaged data chunk to be recovered on the basis of other data chunks in the group and parity data chunks of the group;
    storing the calculated parity data chunks; and
    responsive to the data chunk in the group being damaged, recovering the damaged data chunk on the basis of other data chunks in the group to which the damaged data chunk belongs and parity data chunks of the group.

2. The method according to claim 1, wherein the assigning the data chunks to at least one group comprises: assigning the data chunks to at least one group according to a predefined rule, and the predefined rule comprising at least one of:
    grouping by importance of the data chunks, with data chunks of higher importance being assigned to more groups;

grouping by physical storage locations of the data chunks, with data chunks at adjacent physical locations being assigned to different groups;

grouping by attributes of the data chunks, with data chunks with the same attributes being assigned to different groups; and grouping by attributes of the data chunks, with data chunks with specific attributes being assigned to more groups.

3. The method according to claim 1, wherein with respect to each group, calculating parity data chunks based on data chunks in the group comprises one of:

with respect to each group, using parity check to calculate the parity data chunks on the basis of data chunks in the group;

with respect to each group, determining a check algorithm used by the group according to at least one of attributes and importance of data chunks included in the group, and using the determined check algorithm to calculate parity data chunks on the basis of data chunks in the group.

4. The method according to claim 1, wherein the method further comprises: in response to at least one of a data chunk expiring or being deleted, cancelling a group to which the data chunk belongs, and updating grouping information of other data chunks in the group to which the data chunk belongs.

5. The method according to claim 4, wherein the method further comprises:

with respect to other data chunks in the cancelled group, assigning data chunks that need to be regrouped to a new group according to a predefined rule;

recording grouping information of data chunks that are assigned to the new group;

calculating parity data chunks on the basis of data chunks in the new group; and storing the parity data chunks of the new group.

6. The method according to claim 4, wherein the method further comprises:

in response to at least one of a data chunk expiring and being deleted, deleting parity data chunks of a group to which the data chunk belongs.

7. The method according to claim 1, wherein the method further comprises at least one of steps A and B:

step A: if several data chunks in a same group are damaged and can be recovered on the basis of other undamaged data chunks in the same group and parity data chunks of the same group, recovering the damaged data chunks on the basis of the other undamaged data chunks in the same group and the parity data chunks of the same group;

step B: if several data chunks in a same group are damaged and cannot be recovered on the basis of other undamaged data chunks in the same group and parity data chunks of the same group, seeking a further group to which a first data chunk among the damaged data chunks belongs; recovering the first data chunk on the basis of other data chunks in the found group and parity data chunks of the found group; and recovering other damaged data chunks in the same group on the basis of the recovered first data chunk, the other data chunks in the same group and the parity data chunks of the same group.

8. The method according to claim 1, wherein the storing the calculated parity data chunks comprises: storing the calculated parity data chunks at other physical storage area than where the data chunks are stored.

9. An apparatus for storing data, the apparatus being used for a data deduplication system, the apparatus comprising:

a data chunk obtaining module configured to obtain data chunks achieved from data deduplication;

a grouping module configured to assign the data chunks to at least one group;

a recording module configured to record grouping information of the data chunks, wherein the grouping information associates each data chunk of the data chunks to a given group of the at least one group;

a calculating module configured to, with respect to each group, calculate parity data chunks based on data chunks in the group, wherein the parity data chunks are used for, in response to a data chunk in the group being damaged, causing the damaged data chunk to be recovered on the basis of other data chunks in the group and parity data chunks of the group;

a storing module configured to store the calculated parity data chunks; and a recovering module configured to recover, responsive to the data chunk in the group being damaged, the damaged data chunk on the basis of other data chunks in the group to which the damaged data chunk belongs and parity data chunks of the group.

10. The apparatus according to claim 9, wherein the grouping module is specifically configured to assign the data chunks to at least one group according to a predefined rule, and the predefined rule comprising at least one of:

grouping by importance of the data chunks, with data chunks of higher importance being assigned to more groups;

grouping by physical storage locations of the data chunks, with data chunks at adjacent physical locations being assigned to different groups;

grouping by attributes of the data chunks, with data chunks with the same attributes being assigned to different groups; and grouping by attributes of the data chunks, with data chunks with specific attributes being assigned to more groups.

11. The apparatus according to claim 9, wherein the calculating module comprises one of the following submodules:

a parity check submodule configured to, with respect to each group, use parity check to calculate the parity data chunks on the basis of data chunks in the group;

a flexible check submodule configured to, with respect to each group, determine a check algorithm used by the group according to at least one of attributes and importance of data chunks included in the group, and use the determined check algorithm to calculate parity data chunks on the basis of data chunks in the group.

12. The apparatus according to claim 9, wherein the apparatus further comprises:

a cancelling module configured to, in response to at least one of a data chunk expiring or being deleted, cancel a group to which the data chunk belongs, and update grouping information of other data chunks in the group to which the data chunk belongs.

13. The apparatus according to claim 12, wherein the apparatus further comprises:

a regrouping module configured to, with respect to other data chunks in the cancelled group, assign data chunks that need to be regrouped to a new group according to a predefined rule;

a re-recording module configured to record grouping information of data chunks that are assigned to the new group;

a re-calculating module configured to calculate parity data chunks on the basis of data chunks in the new group; and a re-storing module configured to store the parity data chunks of the new group.

14. The apparatus according to claim 12, wherein the apparatus further comprises:

a deleting module configured to, in response to at least one of a data chunk expiring and being deleted, delete parity data chunks of a group to which the data chunk belongs.

15. The apparatus according to claim 9, wherein the apparatus further comprises at least one of following modules:

a first recovering module configured to, if several data chunks in a same group are damaged and can be recovered on the basis of other undamaged data chunks in the same group and parity data chunks of the same group, recover the damaged data chunks on the basis of the other undamaged data chunks in the same group and the parity data chunks of the same group;

a second recovering module configured to, if several data chunks in a same group are damaged and cannot be recovered on the basis of other undamaged data chunks in the same group and parity data chunks of the same group, seek a further group to which a first data chunk among the damaged data chunks belongs; recover the first data chunk on the basis of other data chunks in the found group and parity data chunks of the found group; and recover other damaged data chunks in the same group on the basis of the recovered first data chunk, the other data chunks in the same group and the parity data chunks of the same group.

16. The apparatus according to claim 9, wherein the storing module is configured to store the calculated parity data chunks at other physical storage area than where the data chunks are stored.

17. A data deduplication system, comprising an apparatus for storing data according to claim 9.

18. A computer program product comprising a non-transitory computer readable storage medium having computer readable program code embodied thereon that is operable, when executed by a data processor, to perform the steps according to claim 1.

19. The method according to claim 1, wherein a first amount of data chunks in one group is different from a second amount of data chunks in another group.

20. The method according to claim 1, wherein at least one of the data chunks is associated with at least two groups.

* * * * *